March 4, 1969     G. T. RANDOL     3,430,745
SELF-ADJUSTING LINKAGE DEVICE FOR CLUTCH ACTUATORS
Original Filed Nov. 19, 1964

*Inventor*

March 4, 1969  G. T. RANDOL  3,430,745
SELF-ADJUSTING LINKAGE DEVICE FOR CLUTCH ACTUATORS
Original Filed Nov. 19, 1964  Sheet 2 of 2
FIG. 2
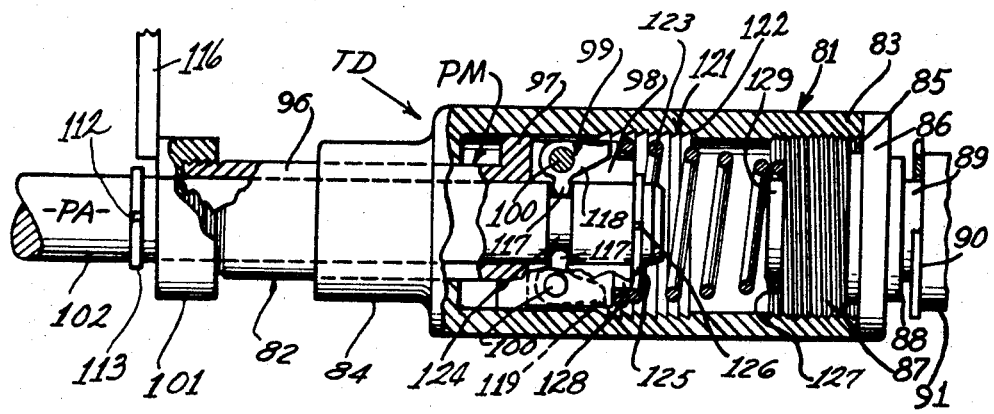
FIG. 3
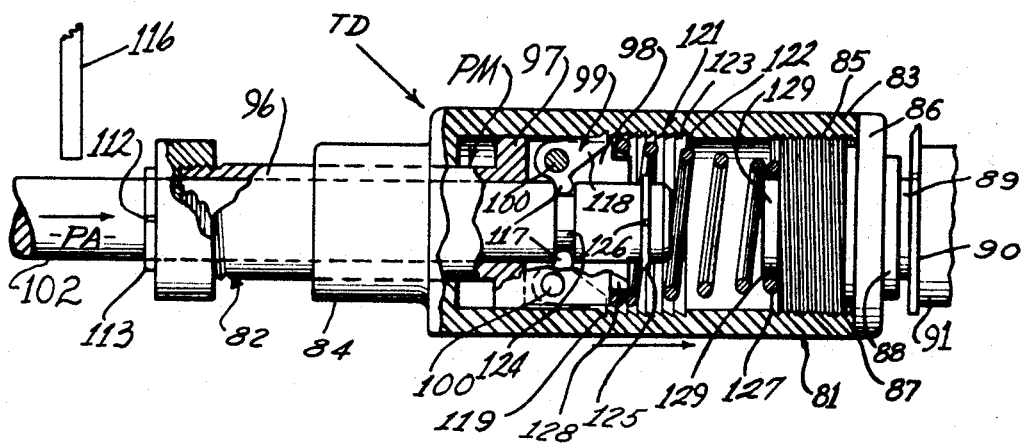
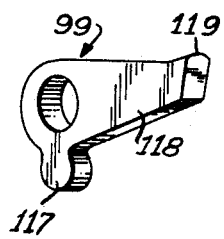
FIG. 4
Inventor

United States Patent Office 3,430,745
Patented Mar. 4, 1969

3,430,745
SELF-ADJUSTING LINKAGE DEVICE FOR
CLUTCH ACTUATORS
Glenn T. Randol, P.O. Box 275,
Mountain Lake Park, Md. 21550
Original application Nov. 19, 1964, Ser. No. 412,428, now
Patent No. 3,314,511, dated Apr. 18, 1967. Divided
and this application Apr. 13, 1967, Ser. No. 630,739
U.S. Cl. 192—111            10 Claims
Int. Cl. F16d 11/00, 13/60, 19/00

ABSTRACT OF THE DISCLOSURE

This invention describes an apparatus for automatically adjusting the interconnecting linkage between a clutch-operating pedal and a spring-engageable friction clutch such as employed on motor vehicles and the like, to compensate for wear between the friction engaging elements and thereby providing uniform stroking of the pedal to effect disengagement of said clutch.

---

This application is a division of my application Ser. No. 412,428 filed Nov. 19, 1964, now Patent No. 3,314,511 issued Apr. 18, 1967.

The present invention relates to automatically adjustable linkage adapted for transmission of force between an actuator and an apparatus to be actuated thereby, the invention having particular reference to that type of self-adjusting linkage utilizable for interconnecting the actuating pedal, for example, with the operating mechanism of a friction engaging device whereby the pedal is maintained automatically at substantially a uniform operating stroke throughout the service life of the friction facings in said friction device irrespective of the extent of wear in such facings and between the operating parts. One of the more serious disadvantages attributable to prior self-adjusting linkage devices for the above purpose, is in their using friction engaging or wedging clutches for stabilizing the adjusting device in its adjusted position until a new adjustment is required. Since such clutches are impositive their operation causes the adjusting device to operate erratically while in process of adjusting and in its adjusted disposition and, at times, fails to adjust completely therefore defeating the primary advantage sought of maintaining a substantially uniform actuator stroke.

The primary objective of the invention is to overcome the abovenoted disadvantage by providing a positive and therefore more reliable form of automatic adjusting linkage mechanism which finds use in motor vehicles and the like for disengaging the main friction engaging clutch, for example, and for operating vehicle brakes to maintain a uniform clearance when released. It is well known that such clutches include frictional elements (facings) subject to wear and normally held in engagement by spring-engaging means. Wear in these elements has the effect of progressively relocating the normal range of movement of the disengaging mechanism. It is therefore an object of the invention to provide positive clutch controlling mechanism which functions automatically to maintain a uniform operating stroke of the actuator for said disengaging mechanism despite the latter assumes a new normal position resulting from such facing wear, thus insuring full engagement and disengagement of the clutch at all times.

Another object of the invention is to provide novel and improved mechanism for maintaining a predetermined clearance between the rotating and non-rotating parts of the friction clutch automatically when the mechanism is in a clutch-engaging disposition, the mechanism being self-adjusting each time the actuator (pedal) is relaxed or the brake as required.

According to the invention, my novel and improved wear-compensating device is operatively incorporated in the linkage which interconnects the clutch-actuator (pedal) with the clutch throw-out yoke (lever) which acts on the clutch-operating levers via a throw-out bearing, said compensating device being operable automatically and positively to modify the length of said linkage in accordance with changes in the normal released position of the clutch yoke due to wear in the clutch facings and between the relatively operating parts and thereby maintaining the operating stroke of the pedal uniform for disengaging the friction clutch against its spring-engaging action throughout the service life of said clutch facings and said parts, or for maintaining uniform operation of vehicle brakes.

Other objects, features and advantages of the invention will become apparent from the following detailed disclosure of a preferred embodiment illustrated by way of example only, when considered in conjunction with the accompanying drawing, in which:

FIGURE 2 is a longitudinal sectional view taken on an enlarged scale along the line 2—2 of FIGURE 1 of the self-adjusting linkage device operatively interposed in the clutch-pedal linkage to compensate automatically for wear in the clutch facings and relatively operating parts thus maintaining the pedal stroke uniform;

Figure 1:
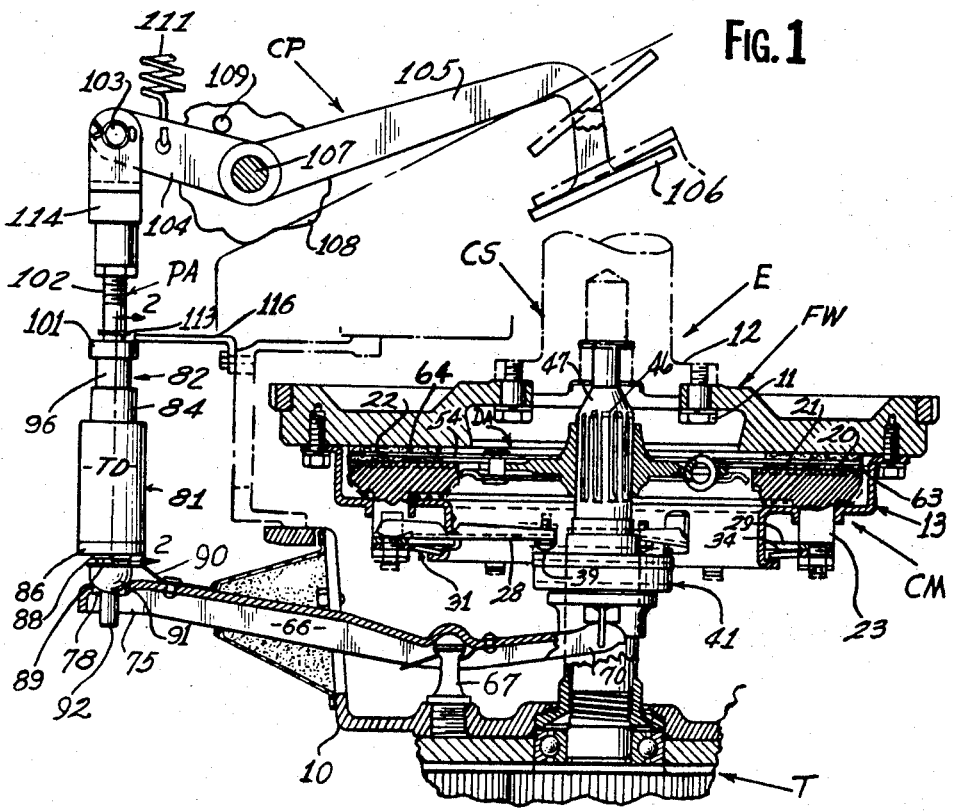
FIGURE 1 is a horizontal-longitudinal sectional view of a friction engaging device (clutch) embodying my invention, and wherein the operating parts are shown in clutch-engaged disposition for transmission of drive-torque thereby with the clutch-pedal in fully released normal position 90° out of phase.

FIGURE 3 is another sectional view similar to FIGURE 2 on the same scale showing an operatively adjusted disposition of the self-adjusting linkage device effective to shorten the pedal-linkage to compensate for a new released position of the clutch-operating yoke resulting from wear in the clutch facings; and FIGURE 4 is a perspective view of one of the positive thrust-transmitting pawls (clutch elements) incorporated in the self-adjusting linkage device.

Referring to the drawing, and particularly to FIGURE 1 thereof, I have used the same reference characters which appear in the parent application above referred to for identifying like and similar parts and components in the present application to facilitate cross references between the related applications, and have disclosed a portion of a motor vehicle and the power plant therefor in operative association with spring-engageable clutch mechanism (device) "CM" embodying my invention. The power plant is illustrated herein as an internal-combustion engine "E" by fragmentary portions of its crankshaft "CS" and flywheel "FW," and has associated therewith the conventional manual change-speed gear transmission fragmentarily shown at "T" and through which the dirigible wheels of the vehicle may be driven at different gear ratios as is well understood in the art. The clutch CM in the broader patent sense may be termed a "friction engaging device" and is arranged to be disengaged and controllably reengaged by means of a clutch-actuator (clutch-pedal) "CP" mounted in the operator's compartment of the vehicle, and which is adapted for operator-actuation or by other means such as a clutch-servo.

The illustrated clutch CM constitutes patentable characteristics but forms no part of the present invention, and therefore is used in the present disclosure for illustrative purposes as being representative of this type of clutch, to demonstrate the novel and patentable features of my self-adjusting take-up device generally designated "TD" which is obviously feasible for installation in other types of clutches particularly the conventional spring-engageable type, and for vehicle brakes.

For purposes of establishing the environmental setting in which the present invention contributes its advantages and benefits, only those parts of the clutch CM operatively related with my self-adjusting linkage take-up TD will be described in order that the novel coaction of the parts comprising said take-up linkage may be readily understood for use not only in my patented clutch but in all other types of friction engaging devices having an actuator and operating mechanism actuated by said actuator.

As shown in FIGURE 1, the engine-driven clutch CM is operatively incorporated on the flywheel FW, and is enclosed, for example, by a bell-shaped housing 10 which also encloses the flywheel, the latter being corotatable with the crankshaft CS by means of cap screw 11 which secure the rear flanged end 12 of the crankshaft to said flywheel. The rear face of the flywheel carries a cup-shaped backing (cover) plate 13, a movable pressure plate 20 having a friction face 21 on the side confronting a complemental friction face 22 defining the rear peripheral marginal side of the flywheel, said pressure plate and cooperating friction faces being of annular configuration as shown. A plurality of cylindrical extensions 23 serves to lock the pressure and cover plates for corotational movement while accommodating axial movement of the pressure plate relative to the cover plate and flywheel to engage and disengage the clutch CM in a well known manner. A plurality of radially disposed clutch-operating levers 28 is intermediately fulcrumed on the cover plate with their outer ends adapted to engage a pressure ring 29 carried by the aforesaid extensions 23, and interposed with respect to said pressure ring and an annular flange 19 on the cover plate 13, is a washer-type spring 31 normally under tension for biasing said pressure ring and pressure plate as a unit toward the flywheel FW in opposition to lever-operation to effect withdrawal from the flywheel to disengage the clutch CM. The inner ends 39 of said levers are adapted to receive thrust-force from a throwout bearing 41.

A clutch driven disc assembly generally designated "DA" is slidably splined at 46 on the clutch output (driven) shaft 47 for co-rotation therewith and for relative floating axial movement. This disc assembly is conventional in all respects and comprises a friction disc 54 having annular friction faces 63, 64 on opposite sides for cooperating with the friction faces 21, 22 on the aforesaid pressure plate and flywheel, respectively, whereby said flywheel and pressure plate when under spring-engaging action frictionally lock said disc assembly DA for transmission of drive-torque from the engine E to the change-speed gear transmission T, said clutch-operating levers being effective under thrust applied to their inner ends 39 via said throwout bearing 41 acted on by the inner end 70 of the throwout lever (yoke) 66 fulcrumed intermediately at 68 on the clutch housing by means of a fixed strut 67 on the clutch housing, to withdraw said pressure plate 20 from said disc assembly DA to disengage said clutch CM, said yoke terminating at its outer end 75 in a centrally apertured concavity 78 for reception of one end of disclosed novel self-adjusting take-up device TD for maintaining pedal stroke uniform irrespective of the amount of wear in the clutch-operating parts or facings effective to change the normal released position of the throwout yoke 66 when the clutch CM is fully engaged.

Reference is now made to the novel self-adjusting linkage take-up device TD, and shown in FIGURES 1, 2 and 3.

This novel wear-compensating device is characterized by a primary function of shortening the linkage for maintaining the pedal stroke uniform and comprises: an outer body member (part) 81, and an inner body member (part) 82 telescopically mounted with respect to each other for rectilinear movements in unison and relative to each other.

The outer body part is an elongated cylindrical sleeve 83 having one end formed with an axially-bored reduced exterior extension 84, and the opposite end is open and provided with an internally threaded terminating portion 85. A closure cap 86 is provided with a complementally threaded portion 87 for engaging the threads in the sleeve to close the open end thereof. The closure cap terminates on its exterior in a reduced diameter extension 88 having an annular groove 89 for reception of the free bifurcated end of a retaining spring 90 anchored at its opposite end to the aforesaid clutch-operating yoke 66 as by means of a rivet as shown in FIGURE 1. The latter extension has a terminating dome-shaped portion 91 which nests in the aforesaid concavity 78 in the outer end of the yoke 66 for universal movement with respect thereto. A reduced extension 92 projects rearward from said dome-shaped portion in coaxial relationship thereto through said concavity aperture to prevent fortuitious displacement between said self-adjusting take-up device TD and said yoke 66 should the retaining spring 90 fail in its purpose. Accordingly, the self-adjusting take-up device TD is pivotally mounted at its rear end on the outer end of the clutch throwout yoke 66 as above described and illustrated on the drawing.

The inner body part is an elongated axially-bored cylindrical element, the inner end of which normally projects substantially halfway into the space obtaining between the inner ends of the closure cap and forward end of the outer body part 81 as shown, and is disclosed herein as a pawl-carrying portion (member) "PM" formed with an elongated sleeve 96 which projects to the exterior of the outer body part through the axial bore in the reduced extension 84. The pawl-carrying portion comprises a piston-like flange 97 diametrically slotted at 98 for reception of a pair of movable pawls 99, respectively, pivotally mounted in said slots on transverse intersecting pins 100, and which normally project the aforesaid space within the outer body part. The outer end of said sleeve 96 carries an annular detachable cap 101.

A pawl-actuator "PM" disclosed herein as an elongated rod 102, projects through the axial bore in said inner body part to the exterior thereof and said outer body part for pivotal connection at 103 to the lower arm 104 of the clutch-pedal "CP." The upper arm 105 of said pedal terminates in a foot-pad 106 for operator application of actuating pressure thereto. The clutch-pedal is pivotally mounted at the juncture of its lower and upper arms on a shaft 107 fixed at one end to a portion 108 of the vehicle or other suitable mounting location. A stop pin 109 fixed on said vehicular portion limits the retractive (release) movement of the clutch-pedal corresponding to full clutch engagement.

A pedal return spring 111 is operatively connected at opposite ends between the lower arm of said pedal and said fixed portion on the vehicle, respectively, to bias the pedal and connected linkage which includes the aforesaid self-adjusting take-up device TD, toward normally released (relaxed) position for full clutch engagement. This spring also serves to reinstate the limited relative operating movement of the pedal for actuating the aforesaid pawls 99 into engaged position (see FIGURE 3) with said outer body part prior to the latter being moved by said pedal to disengage the clutch CM as will appear.

The pawl-actuator PA is provided with an external annular groove 112 which receives a split stop ring 113, the latter being normally spaced predeterminately from the capped-end portion of the inner body part to define the aforesaid relative pawl-actuating movement of said actuator. The extreme forward end portion of the pawl-actuator is processed with threads for installation of an adjustable clevis 114 to effect said pivotal connection 103 with the lower arm of the clutch-pedal.

Accordingly, pressure applied to the foot-pad of the clutch-pedal CP is effective to rotate the same in a counterclockwise direction as viewed from FIGURE 1, to effect through the linkage connection a corresponding direction of rotation of the clutch throw-out yoke 66 and thereby disengaging the clutch CM against reaction from the clutch-engaging spring 31.

The outer capped end 101 of the inner body part is engageable by a striker element 116 fixed at one end to a fixed portion of the vehicle or other suitable location. When the striker is engaged by the capped-end of the inner body part, the pawl-actuator PA is provided with limited relative movement as shown by the space obtaining between said stop ring 113 and the confronting side of the capped-end of said elongated sleeve 96. This is the normal relationship between fully released clutch-pedal position under influence of the pedal return spring 111 and fully disengaged condition of the aforesaid pawls 99 therefore said inner body part PM as shown in FIGURES 1 and 2, respectively, whereby the latter are operative to accommodate shortening of the linkage connection between the clutch-pedal and clutch pressure plate 20 in the event that the latter becomes the prime mover as a result of clutch facing wear under influence of the engaging spring 31. The clutch is normally the prime mover for controlling clutch operations, but if wear occurs in the clutch facings to the extent that reaction from the engaging spring 31 continues to apply pressure on the clutch throw-out yoke 66 after the clutch-pedal has returned to normal released position, then the self-adjusting take-up device TD becomes effective to compensate for such wear by shortening the linkage connection to relax the yoke and thereby reinstating the clutch-pedal as the prime mover for clutch operations.

Each of the pawls 99 as shown in FIGURE 4, is formed with a lower depending arm 117, and a longer substantially horizontal arm 118 which terminates in a prong 119 adapted to selectively engage a plurality of circular serrations (clutch elements) 121 formed in the inner surface of the outer body part 81. These serrations are characterized by a plurality of axially spaced circular shoulders 122 normal to the axis of the self-adjusting take-up device TD, and interconnecting angular ramp segments 123 therebetween, whereby outward radial movement of the pawls 99 is effective to engage their respective prongs in the registering serration after the device TD has operated to shorten the pedal linkage, to lock the inner and outer body parts in their axially-adjusted positions to move as a unit under influence of pedal-actuation to operate the clutch throw-out yoke 66 to disengage the clutch CM. It should be noted here that the pawls are capable of locking these two components for movement as a unit in one direction only to disengage the clutch CM, and thereby producing what may be termed a positive one-way drive for the purpose stated.

The free ends of the lower arms 117 of the pawls 99 terminate in a partially rounded contour which engages an annular groove formed in the pawl-actuator PA whereby limited reciprocable movement aforesaid as defined by the stop ring 113 and another stop ring 125 engaging a complemental external annular groove adjacent the inner end of said pawl-actuator PA, is established, said latter stop ring normally engaging the inner end of said piston-like flange 97 when the clutch-pedal CP is fully relaxed for full clutch engagement under influence of the clutch-engaging spring 31.

A conical-type normally compressed spring 127 is operatively disposed between the inner end of said piston-like flange 97 and the inner threaded portion end of the closure cap 86. Both ends of this spring being stabilized against disalignment by means of annular shoulders 128, 129 defining the inner ends of said piston-like flange and closure cap 86, respectively. The purpose of this conical spring is to bias the inner and outer body parts apart to lightly take-up the slack in the clutch linkage when the clutch CM is fully engaged, but without sufficient force as to create a wearing pressure between the clutch throw-out bearing 41 and the inner ends of the clutch-operating levers 28 and said yoke 66.

For flexibility in terminology, it should be noted that the pawl-actuator PA, inner body part 82 and outer body part 81 produce first, second and third body members, respectively, and that these three components are arranged in telescopic relationship.

*Operational summary*

Although the manner in which my invention achieves its objectives should be manifest from the foregoing description augmented by an inspection of the drawing, a brief restatement will be given to insure a clear understanding of the novel coaction of the various components as follows:

Assuming the clutch CM is fully engaged as demonstrated by FIGURE 1, under influence of the diaphragm-type spring 31, and the clutch-pedal CP in normal relaxed disposition defined by its lower arm 104 in engagement with the stop pin 109 under influence of the pedal return spring 111. Also, the outer capped end 101 of the inner body part 82 is in engagement with the striker element 116 to establish the normal released position of said inner body part. Accordingly, the fixed striker element 116 and the stop pin are effective when engaged as aforesaid to define the normal released positions of the inner body part and the clutch-pedal CP, respectively, thus providing uniform movement of said clutch-pedal between its two extremes, and a normal released position for said inner body part 82, corresponding to full clutch engagement.

In the normal positions aforesaid of said pawl-carrying portion PM and clutch-pedal, the abutment ring 113 on said pawl-actuator is spaced from the confronting capped-end of said inner body part 82, and the other abutment ring 125 is abutting the confronting inner end of said pawl-carrying portion PM as shown in FIGURE 2. Under these conditions, any change of position from normal of the clutch throw-out yoke 66 due to wear in the clutch facings carried by the driven disc assembly DA, requires that the linkage connection which includes the self-adjusting take-up device TD between the clutch-pedal and throw-out yoke be shortened to prevent spring-engaging action on the pressure plate 20 from holding the clutch friction members in "slipping" engagement under influence of said clutch-engaging spring 31 transmitting reaction through the clutch-operating levers 28, thence to the clutch throw-out bearing 41 and connected inner end of the throw-out yoke 66 because the latter cannot move clockwise as viewed in FIGURE 1 the compensating distance requisite for relaxation thereof due to the clutch-pedal CP being against its stop pin 109.

Therefore, the self-adjusting take-up device TD must be made operative to enable the outer body part 81 to move the required compensating distance relatively to the inner body part 82 to shorten the linkage connection between the outer end of the throw-out yoke 66 and the lower arm 104 of the clutch-pedal CP and thereby enabling spring-engagement of the clutch CM irrespective of change in the normal released position of the clutch throw-out yoke 66 as a result of wear in the clutch facings. Such normal released positions of the clutch throw-out yoke 66 being always in a clockwise direction toward the clutch pedal as viewed in FIGURE 1 because clutch facing wear moves the pressure plate 20 closer to the engine flywheel FW under influence of the clutch-engaging spring 31. This movement of the pressure plate 20 is transmitted through the three extensions 23 having flattened portions to accommodate straddle-mounting of the outer ends of the clutch-operating levers 28 so that their arcuate working edges can engage the pressure ring 29 fixed to the exterior of all six extensions 23 (plain and flatted), and thence to the clutch throw-out bearing 41 which in turn moves farther outwardly from said flywheel to rock the clutch throw-out yoke 66 on its fulcrum strut 67 and thereby imparting clockwise movement thereto according to the degree of movement of the pressure plate to effect firm lock-up of the friction disc assembly DA between the pressure plate and flywheel for firm engagement of the clutch CM upon full release of the clutch-pedal CP as is understood.

It is thus seen that the self-adjusting take-up device TD is operable to shorten the linkage connection between the clutch-pedal CP and throw-out yoke 66 when the locking pawls 99 are disengaged from their cooperating series of closely generated clutch elements indented in the inner cylindrical surface of the outer body part 81 as shown in FIGURE 2 wherein the clutch-pedal is in normal position, the pawl-carrying portion PM in its normal position, and the abutment ring 113 in spaced relation to the confronting capped-end 101 of the inner body part 82, and the other abutment ring 125 on the pawl-actuator PA is in abutting relationship to the inner end of said pawl-carrying portion PM. In the broader patent sense the two abutment rings may be termed a "pair of abutment-engaging elements."

Under these conditions the clutch throw-out yoke 66 is in normal relaxed position with the clutch friction members spring-biased into lock-up condition for maximum torque-transmitting efficiency. The conical separating spring 127 is reacting between the inner and outer body parts with sufficient force to take-up the backlash that may be present in the clutch linkage which includes the clutch-operating levers 28, said latter spring when installed being under a preload of such degree so as to maintain the pedal connections to the clutch-operating levers 28 free of backlash but in no case exerting a force of such magnitude that would cause wear between the inner ends of the levers 28, throw-out bearing 41, and yoke 66.

If it is desired to disengage the clutch CM, the operator would apply foot-pressure to the foot-pad of the clutch-pedal CP and thereby rotating the same counterclockwise on its pivotal shaft 107 to first dashed line position shown in FIGURE 1 to take-up the relative movement between the abutment ring 113 and the capped-end 101 of the inner body part 82 which relative movement rotates the pawls 99 on their pivotal pins 100 in a counterclockwise direction as viewed in FIGURE 3 to engage their prongs on the horizontal arms with the registering clutch serration on the outer body part 81. Additional rotation of the clutch-pedal CP to second dashed line position is effective to move the pawl-actuator PA, pawl-carrying portion PM and outer body part 81 as a unit to rotate the clutch throw-out yoke 66 on its fulcrum in a counterclockwise direction and thereby sliding the throw-out bearing 41 toward the engine flywheel, and thus rotating the clutch-operating lever 28 on their fulcrum points to retract (withdraw) the pressure plate 20 from the disc assembly DA in opposition to reaction from the clutch-engaging spring 31 whereby clutch-disengagement is rendered effective as shown in dashed lines applied to the pressure plate 20 in FIGURE 1.

During such disengaging operation of the clutch CM, the clutch-pedal is the prime mover, but upon release of the clutch-pedal for clutch re-engagement under bias of the clutch-engaging spring 31, the latter becomes the prime mover opposed by force exerted through the clutch-pedal by the operator.

If wear is present in the clutch facings of negligible degree, the parts will assume their normal relaxed positions as shown in FIGURES 1 and 2, but if sufficient wear has occurred, this means that the clutch throw-out yoke 66 will take up a new normal relaxed position as explained above which new position cannot be established unless the outer body part 81 of the self-adjusting take-up device TD is released as shown in FIGURE 2 for relative longitudinal movement with respect to the inner body part 82 to compensate for this new yoke position requiring a shorter linkage connection with the clutch-pedal CP. Accordingly, when the clutch-pedal has been fully released against its stop pin 109 upon the capped-end 101 of the inner body part 82 engaging the striker element 116 to establish the normal released position of the part 82, this operation restores the relative operating movement between the abutment ring 113 and capped-end of said inner body part 82 as shown in FIGURES 1 and 2, and if there is present a reactive force from the clutch-engaging spring 31 against said pedal which prevents the clutch CM from fully engaging as would be the case were the operator "riding" the pedal, and with the pawls 99 disengaged as shown in FIGURE 2, the outer body part 81 is released to move under such spring reactive force to establish a new relationship between the prongs of the pawls and cooperating clutch serrations indented in the outer body part. The conical separating spring 127 yields under said clutch-engaging spring 31 to accommodate this new relative disposition between the inner and outer body parts, whereupon the next clutch-disengaging cycle as above described, will effect locking of the pawl prongs in the new registering serration corresponding to the shortened length of the linkage connection between the clutch-pedal and outer body part 81. Subsequently, the clutch-pedal can be operated to second dashed line position as shown in FIGURE 1 and thereby disengaging the clutch CM in the same manner as above described in detail.

It is thus seen that the disclosed self-adjusting take-up device TD is effective to shorten the clutch-pedal linkage connection aforesaid only when the clutch-pedal has been fully relaxed against its stop pin 109 to disengage the pawls 99, and, should wear of sufficient degree be present in the clutch facings, the normal released position of the throw-out yoke 66 will change, that is, the outer end moves closer to the clutch-pedal. Such change in the normal position of the clutch throw-out yoke is compensated for by a corresponding relative movement of the outer body part 81 to the inner body part 82. Since the pedal moves through a uniform stroke defined by two extremes to disengage and control reengagement of the clutch CM, the self-adjusting take-up device TD provides the special advantage of enabling such clutch stroke to remain uniform throughout the service life of the clutch facings.

Further consider the operational behavior and advantages of the novel self-adjusting take-up linkage mechanism TD, it is important to note that the clutch pedal and clutch throw-out yoke work in opposition to each other during the disengaging and re-engaging operations, respectively, of the clutch CM, therefore, these two components may be termed "primer movers" since pedal-actuation to disengage the clutch opposes reaction from the throw-out yoke under influence of spring-pressure via the clutch-operating levers 28, and conversely, during release of the clutch-pedal for clutch-re-engagement, the clutch-engaging spring 31 reacts through said levers 28 and yoke 66 on the clutch-pedal. Accordingly, the novel take-up mechanism TD is operatively acted on in opposition by these two prime movers to disengage the clutch CM, and when the clutch is being released for reengagement relative adjustment is subsequently accommodated between the cooperating parts of the mechanism TD to modify the length of the pedal-linkage in accordance with the new normal position of the clutch yoke resulting from wear in the clutch facings.

Moreover, in conventional clutches in which the actuator (pedal) is mechanically linked directly to an operating portion thereof (yoke 66) to control clutch-engaging and disengaging operations, as wear occurs in the clutch facings a correspondingly longer pedal stroke results which contributes to slower clutching operations with resultant impairment to expeditious and well-timed speed-changing in the associated transmission with the further disadvantage, in the case of excessive wear in the clutch facings, of increasing the pedal stroke sufficiently to come into contact with the underside of the toeboard of the driver's compartment before relaxed position becomes effective thus holding the cltuch in partially engaged condition as when the driver "rides" the clutch-pedal, with resultant loss of torque-transmitting efficiency, and excessive wear on the throw-out bearing under thrust between the clutch-operating levers and throw-out lever 66 produced by the clutch-engaging spring 31.

The foregoing description is believed to set forth clearly the achieving of the various stated objectives and advantages of my invention. In the broader patent sense, the clutch-pedal may be termed an energizable clutch-actuator with included means for operatively energizing the same.

The present invention contemplates use of any type of spring-engageable or fluid-pressure engageable clutch in operative association with the novel self-adjusting take-up mechanism TD, whether the clutch-operating levers 28 are actuated by the disclosed clutch-pedal CP, for example, or by fluid pressure means. It is thus seen that the present take-up mechanism TD has a wide range of practical applications in motor vehicles and the like whether the clutch is driver or power-controlled.

The preferred embodiment of the invention herein disclosed has been illustrated and described to explain the nature of the invention by way of example only. It will be obvious that changes, substitutions and modifications in the details and their interaction may be resorted to by persons skilled in the art without departing from the scope or fair meaning defined by the terms of the subjoined claims.

Having thus described my invention, I claim:

1. An automotive clutch having friction-engaging driving and driven members with the latter member provided with a friction facing subject to wear, spring means effective to engage said clutch members, an actuator including an element movable between two extremes for controlling disengagement and re-engagement of said clutch members, a clutch housing, a plurality of radially-disposed clutch-operating levers operatively incorporated between said driving and driven members, a clutch throw-out bearing slidable coaxially with respect to said clutch members and which is effective on the inner ends of said operating levers to effect disengagement of said clutch members, a clutch throw-out yoke pivotally mounted on said clutch housing with its inner end portion adapted to engage said throw-out bearing to slide the same, and an operative linkage connection between the outer end of said throw-out yoke and said actuator element, the length of said linkage connection being subject to change due to wear in said friction facing effective to establish a new normal relationship between said actuator element and said driven member in accordance with the degree of wear present when said clutch members are fully engaged, the improvement which comprises: a self-adjusting take-up mechanism operably interposed in said linkage connection including an inner and an outer body member and an actuatable member coaxially-related with said body members which are characterized by limited relative movement with respect to each other to shorten said linkage connection in accordance with the extent of wear between the friction engaging members and thereby maintaining uniform actuation of said actuator to effect disengagement of said friction engaging members; spring means including a normally compressed spring reacting between said body members to separate them and to accommodate their relative movement toward each other to shorten said linkage connection; a plurality of ratchet serrations carried by the outer body member; a pawl pivotally mounted on the inner body member and including a pair of arms, one of which continuously engages said actuatable member to actuate the other arm of said pawl into selective engagement with said serrations and thereby clutching said body members together for conjoint movement in one direction in response to initial actuation of said actuatable member under influence of said actuator.

2. An automotive clutch having friction-engaging driving and driven members with the latter provided with a friction facing subject to wear, spring means effective to engage said clutch members, an actuator including an element movable between first and second extremes for controlling disengagement and re-engagement of said clutch members, a clutch housing, a plurality of radially-disposed clutch-operating levers operatively incorporated between said clutch members, a clutch throwout bearing slidable coaxially with respect to said clutch members and which is effective on the inner ends of said operating levers to effect disengagement of said clutch members, a clutch throw-out yoke pivotally mounted on said clutch housing with its inner end portion adapted to engage said throw-out bearing to slide the same, and an operative linkage connection between the outer end of said throw-out yoke and said actuator element, the length of said linkage connection being subjected to change due to wear in said friction facing effective to establish a new normal relationship between said actuator element and said driven member in accordance with the degree of wear present when said clutch members are fully engaged, the improvement which comprises: a self-adjusting take-up mechanism operably interposed in said linkage connection including an inner and an outer body member and an actuable member coaxially-related with said body members which are characterized by limited relative movemet with respect to each other to shorten said linkage connection in accordance with the extent of wear between the friction engaging members and thereby maintaining uniform actuation of said actuator to effect disengagement of said friction engaging members; spring means including a normally compressed spring reacting between said body members to separate them and to accommodate their relative movement toward each other to shorten said linkage connection; a plurality of ratchet serrations carried by the outer body member; a pawl pivotally mounted on the inner body member and including a pair of arms, one of which continuously engages said actuable member to actuate the other arm of said pawl into selective engagement with said serrations and thereby clutching said body members together for conjoint movement in one direction in response to initial actuation of said actuable member under influence of said actuator; a fixed element engageable by said inner body member moving in the opposite direction for disengaging the other arm of said pawl from the active ratchet serration to enable relaive adjutsing movements between said body members in accordance with shortening of said linkage connection as a function of a newly established normal relationship between said actuator element and said driven member produced by wear between said clutch members, upon said actuator and connected actuable member being stabilized in their clutch engaging extreme aforesaid; and means for stabilizing said actuator and included element.

3. An automotive clutch having friction-engaging driving and driven members with the latter member provided with friction facings subject to wear, spring means effective to engage said clutch members, an actuator including an element movable between two extremes for controlling disengagtment and re-engagement of said clutch members, a clutch housing, a plurality of radially-disposed clutch-operating levers operatively incorporated between said driving and driven members, a clutch throw-out bearing slidable coaxially with respect to said members and which is effective on the inner ends of said operating levers to effect disengagement of said clutch members, a clutch throw-out yoke pivotally mounted on said clutch housing with its inner end portion adapted to engage said throw-out bearing to slide the same, and an operative linkage connection between the outer end of said throw-out yoke and said actuator element, the length of said linkage connection being subject to change due to wear in said friction facings effective to establish a new normal relationship between said actuator element and said driven member in accordance with the degree of wear present when said clutch members are fully engaged, comprising: a self-adjusting take-up mechanism operably incorporated in said linkage connection and having a pair of relatively movable body members; one-way positive clutch means operably incorporated between said body members and including a plurality of radially movable clutching elements and a plurality of cooperable clutch elements formed on the outer body member and which are adapted to lock said body members to move as a unit in one direction upon the outer body member moving relatively in one direction to shorten said linkage connection, and thereby effecting clutch disengagement under said actuator moving toward its clutch-disengaging extreme, said clutch means being adapted to disengage upon said actuators returning to its clutch-engaging extreme to accommodate relative wear-compensating movement between said body members in said one direction to shorten said linkage connection according to the new normal position of the throw-out lever under reaction from said spring means to fully engage said friction engaging members as wear occurs therebetween; and a fixed element effective to stabilize said inner body member for disengaging said clutch means to release said body members for relative wear-compensating movement aforesaid, upon said actuator returning to its clutch-engaging extreme aforesaid.

4. An automotive clutch having friction-engaging driving and driven members with the latter member provided with friction facings subject to wear, spring means effective to engage said clutch members, an actuator including an element movable between first and second extremes for controlling disengagement and re-engagement of said clutch members, a clutch housing, a plurality of radially-disposed clutch-operating levers operatively incorporated between said driving and driven members, a clutch throw-out bearing slidable coaxially with respect to said clutch members and which is effective on the inner ends of said operating levers to effect disengagement of said clutch members, a clutch throw-out yoke pivotally mounted on said clutch housing with its inner end portion adapted to engage said throwout bearing to slide the same, and an operative linkage connection between the outer end of said throw-out yoke and said actuator element, the length of said linkage connection being subject to change due to wear in said friction facings effective to establish a new normal relationship between said actuator element and said driven member in accordance with the degree of wear present when said clutch members are fully engaged, comprising: a self-adjusting take-up mechanism operably incorporated in said linkage connection and having a pair of relatively movable body members; one-way positive clutch means operably incorporated between said body members and which are adapted to lock said body members to move as a unit upon relative movement of the latter in one direction to shorten said linkage connection to effect clutch disengagement under actuator movement toward its second extreme, said clutch means being adapted to disengage upon said actuator returning to its first extreme to accommodate relative movement of said body members in the other direction to shorten said linkage connection according to the new normal position of the throw-out yoke under reaction from said spring means to fully engage said clutch members as wear occurs in said friction facings; an actuating element for said clutch means and which is coaxially related with said body members to establish normal disengaged position of the former with respect to the latter when fully engaged; and a fixed element engageable by said actuating element for establishing said normal disengaged position of said clutch means, the latter including a plurality of clutch elements having pivotal axes, respectively, carried by one of said body members and movable to engage cooperating clutch elements carried by the other body member, another spring means including a normally compressed spring for biasing said body members apart, and abutment means for uniform pivotal movement of said first-defined clutch element upon each initial actuation of said actuator from its first extreme; and mechanical means for interconnecting said actuator element with said actuating element to move as a unit in both directions.

5. An automatically adjusting force-transmitting link device for use with a friction engaging device comprising in combination, a pair of prime movers working in opposition to each other and having normal positions, respectively; first, second and third telescopically related slidable body members; means connecting one of said prime movers to said first body member; means connecting the other of said prime movers to said third body member; a movable clutch element operatively carried by said second body member in operative interposition with respect to said first and third body members, and connected to said first body member for relative and unitary movements with respect thereto; a normally compressed spring effective between said second and third body members for biasing them apart; another normally compressed spring for biasing said one prime mover toward normal position; spring means including a normally compressed spring for effecting engagement of said friction device and simultaneously moving said other prime mover toward normal position; a plurality of closely generated clutch elements fast on said third body member and which are adapted for selective engagement by said movable clutch element to produce a one-way positive drive between said prime movers and interposed three body members moving as a unit therewith to effect disengagement of said friction device upon an initial predetermined relative movement of said first body member with respect to said second body member to effect such positive drive; a pair of abutment-engaging elements carried by said first body member for selective engagement with opposing spaced portions, respectively, on said second body member to define the aforesaid initial predetermined relative movement of said first body member; means engageable by said second body member for stabilizing the same in normal released position whereby relative movement of said first body member under influence of the first-defined spring reacting through said one prime mover, is effective to disengage said movable clutch element from the effective clutch element carried by said third body member and thereby accommodating relative movement between said second and third body members upon said one prime mover moving to normal position under influence of said other prime mover and said other spring, whereupon said third body member is moved under influence of said other prime mover relatively to said second body member in the event the normal position of said one prime mover in normal position is under bias produced by said other prime mover due to wear in said friction facings changing the normal position of said other prime mover relative to the one prime mover.

6. An engine flywheel-driven clutch mechanism having a friction faced driven member engageable with said flywheel under force exerted by biasing means, an actuator actuatable from normal position for disengaging said driven member from said flywheel, and an operative linkage connection between said actuator and said driven member, and which is subject to change in length due to wear in the friction faced member, comprising: a wear-compensating mechanism for maintaining uniform actuation of said actuator automatically, and which includes an outer body member having a bore therein, a pair of inner body members telescopically-related to each other and to said outer body member, and which are mounted for coaxial sliding movement in said bore, spring means including a normally compressed spring operably disposed between said outer body member and one of said inner body members for axially displacing them apart; a pawl pivotally mounted on said one inner body member and having a pair of arms, one of said arms being adapted to selectively engage ratchet-like shoulders indented in the inner cylindrical surface defining said bore for unitary movement of all three body members in one direction to effect disengagement of said friction faced driven member form said flywheel upon actuation of said actuator from normal position, the other arm being adapted to continuously engage said other inner body member to operate said pawl into and out of engagement with said ratchet-like shoulders in response to limited relative movement of said other inner body member under initial actuator-actuation from normal position; a fixed element engageable by said one inner body member for establishing the latter in normal position when said actuator is in normal position; and a pair of abutment-engaging elements carried by the other inner body member in longitudinally spaced relation, to selectively engage a pair of portions, respectively, on said one inner body member and thereby establishing said limited relative actuation of said other inner body member to actuate said pawl into and out of engagement with said ratchet-like shoulders.

7. A self-adjusting force-transmitting device operably incorporated in linkage for interconnecting a clutch-actuator with operating means for an automotive friction clutch having a flywheel-drive member and a friction faced driven member subject to wear and which is movably engageable with said drive member under force exerted by biasing means in opposition to said actuator, comprising: an inner and an outer body member and an actuatable member coaxially-related with said body members which are characterized by limited relative movement with respect to each other to shorten said linkage in accordance with the extent of wear in the friction faced member and thereby maintaining uniform actuation of said actuator; spring means including a normally compressed spring for biasing said body members apart and accommodating their relative movement toward each other to shorten said linkage; ratchet serrations carried by the outer body member; a pawl pivotally mounted on the inner body member and including a pair of arms, one of which continuously engages said actuatable member to actuate the other arm of said pawl into selective engagement with said ratchet serrations and thereby clutching said body members together for conjoint movement as a unit in one direction in response to initial actuation of said actuatable member under influence of said clutch-actuator.

8. A linkage-adjusting mechanism for use in interconnecting a clutch-actuator pedal with operating means for an automotive friction clutch having a flywheel-drive member and a friction faced driven member subject to wear and movably engageable with said drive member under force exerted by biasing means in opposition to pedal-actuation, comprising: an inner and an outer body member and an actuatable member coaxially-related with said body members which are characterized by limited relative movement with respect to each other to shorten said linkage mechanism and thereby maintaining uniform actuation of said pedal; spring means including a normally compressed spring for biasing said body members apart and for accommodating their relative movement toward each other to shorten said linkage mechanism; ratchet serrations carried by the outer body member; a pawl piovtally mounted on the inner body member and including a pair of arms, one of which continuously engages said actuatable member to selectively actuate the other arm of said pawl into engagement with said ratchet serrations and thereby clutching said body members together for conjoint movement as a unit in one direction in response to initial actuation of said actuatable member under influence of said clutch-actuating pedal.

9. A self-adjusting take-up mechanism operatively influenced in opposite directions by a pair of prime movers having normal released positions, respectively, and which is adapted to control a friction engaging device characterized by a drive member and a driven member with at least one of said members being provided with a friction facing subject to wear, said mechanism comprising a pair of telescopically-related relatively movable body members with one being acted on by one of said prime movers; an actuatable member telescopically-related coaxially with respect to said pair of body members; means connecting said actuatable member to the other of said prime movers; a movable clutch element operatively carried by the other of said pair of body members and directly actuated by said actuatable member for selectively engaging a series of ratchet-like clutch elements carried by said one body member to enable said other prime mover to move said pair of body members as a unit in opposition to said one prime mover; means including a fixed element effective to disengage said clutch elements upon said other prime mover moving to normal position under influence of said one prime mover, whereupon said one body member is movable relatively to said other body member under influence of said one prime mover in the event the normal position of said other prime mover induces bias thereagainst from said one prime mover due to wear in said friction facing effective to change the normal position of said one prime mover; and spring means including a normally compressed spring reacting between said body members to bias them apart thus releasably stabilizing their relatively adjusted positions induced by said one prime mover.

10. An automatically adjusting force-transmitting link device for use with a friction-engaging device subject to wear, comprising in combination: a pair of prime movers in opposing relation and having normal positions, respectively, with one of said prime movers effective to engage said friction device; first, second and third telescopically slidable body members; means connecting the one prime mover to the first body member; means connecting the other primer mover to said third body member, said other prime mover being effective to disengage said friction device; a movable clutch element operatively carried by said second body member in interposition with respect to said first and third body members, said clutch element being selectively engageable with a plurality of closely generated clutch elements on said first body member to produce a one-way thrust connection between said first and second body members to disengage said friction device in opposition to said one prime mover; a normally compressed spring reacting between said first and second body members to bias them apart; a fixed element engageable by said other prime mover for establishing normal position thereof; another normally compressed spring for biasing said other prime mover toward normal position; a pair of spaced abutment-engaging elements carried by said third body member for selective engagement with a pair of opposing portions, respectively, on said second body member with one abutment element and cooperating portion in normally engaged relation and the other abutment element and cooperating portion being normally spaced to establish a predetermined relative movement of said third body member with respect to said second body member; a fixed stop element engageable by said second body member for stabilizing the latter in normal released position and corresponding to disengagement of said movable clutch element and engagement of said friction device whereby relative movement of said third body member upon engagement of said friction device under said one prime mover is effective to disengage said movable clutch element from the active clutch element on said first body member to disconnect said first and second body members for relative wear-compensating movement therebetween accommodated by yielding of said first-defined spring upon said other prime mover moving to normal position under influence of said one prime mover in cooperation with said second-defined spring whereupon said third body member is movable relatively to said second body member under influence of said other prime mover operating through said predetermined relative movement to engage said movable clutch element with a newly activated clutch element on said first body member as a function of relative wear-compensating movement effective to change the normal relative position of said one prime mover for uniform movement of said other prime mover to effect disengagement of said friction device via re-establishment of said one-way connection in opposition to said one prime mover.

References Cited

UNITED STATES PATENTS

| | | |
|---|---|---|
| 2,036,004 | 3/1936 | Wemp. |
| 2,073,705 | 3/1937 | Moorhouse. |
| 2,904,137 | 9/1959 | Reisch. |
| 3,286,803 | 11/1966 | Zeidler. |
| 3,307,667 | 3/1967 | Maurice. |
| 2,705,482 | 4/1955 | Randol. |

FOREIGN PATENTS

| | | |
|---|---|---|
| 490,856 | 2/1953 | Canada. |
| 577,339 | 5/1946 | Great Britain. |

BENJAMIN W. WYCHE III, *Primary Examiner.*

U.S. Cl. X.R.

188—196; 192—99